United States Patent Office 2,815,384
Patented Dec. 3, 1957

2,815,384

PROCESS FOR THE PRODUCTION OF 2-CHLORO-ACROLEIN AND DERIVATIVES THEREOF

Howard R. Guest, Charleston, and Harry A. Stansbury, Jr., South Charleston, W. Va., assignors to Union Carbide Corporation, a corporation of New York No Drawing. Application January 6, 1955,
Serial No. 480,294

11 Claims. (Cl. 260—601)

This invention relates to an improved method of preparing 2-chloroacrolein and derivatives thereof.

2-chloroacrolein is a material valuable for the preparation of polymers and copolymers thereof as well as an intermediate for such compounds as 2-chloro-1,1,3-triethoxypropane and 1,1,3-triethoxy-2-propene.

It has been proposed heretofore to prepare 2-chloroacrolein by chlorinating acrolein to form 2,3-dichloropropionaldehyde and then dehydrochlorinating that intermediate product in the presence of hot water. These steps are represented by the following equations:

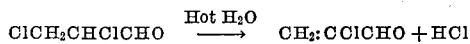

This method leaves much to be desired because the 2-chloroacrolein polymerizes very readily, particularly in the presence of aqueous hydrogen chloride formed in the reaction.

It has been suggested heretofore to carry out the dehydrochlorination of the 2,3-dichloropropionaldehyde in the presence of an alkaline salt such as sodium acetate in order to neutralize the hydrochloric acid and thereby improve somewhat the yield of 2-chloroacrolein. Unfortunately, however, the use of sodium acetate in this process has the serious disadvantage of producing acetic acid in the 2-chloroacrolein which is steam-distilled and condensed as an oil layer. Because of the proximity of the boiling points of acetic acid and 2-chloroacrolein, i. e. 43° C. and 36° C. respectively, at 40 mm., the two cannot efficiently be separated by fractional distillation.

The surprising discovery has now been made that these disadvantages can be avoided and that 2-chloroacrolein can be produced with greater efficiency and in a more desirable form by dehydrochlorinating the 2,3-dichloropropionaldehyde with hot water and in the presence of a primary or secondary monohydric alcohol having not more than ten carbon atoms in the molecule. Methanol, ethanol, n- and iso-propanols, primary and secondary butanols and pentanols, substituted alcohols such as 2-ethyl butanol and 2-ethyl hexanol, and cyclic alcohols such as cyclohexanol are particularly desirable in the preparation of 2-chloroacrolein in accordance with the method of the invention. Ethanol is preferred.

In the preferred embodiment of this step of the process, the dehydrochlorination is accomplished by heating water, preferably containing a minor proportion of ethanol, in a still and slowly, i. e., at a rate not substantially in excess of the rate of dehydrochlorination, introducing 2,3-dichloropropionaldehyde and the alcohol into the reflux column. The 2,3-dichloropropionaldehyde and alcohol may be introduced separately or together, i. e., in the form of an alcoholic 2,3-dichloropropionaldehyde solution. The weight of alcohol should be at least about equal to the weight of dichloropropionaldehyde, the molar proportion of alcohol to the aldehyde being preferably 4:1 or greater.

Further in accordance with the invention, the 2-chloroacrolein so obtained in aqueous and alcoholic solution may be dried and reacted with ethanol to form 2-chloro-1,1,3-triethoxypropane and this in turn may be dehydrochlorinated at an elevated temperature by reaction with an alkali metal hydroxide in the presence of a catalyst to produce 1,1,3-triethoxy-2-propene.

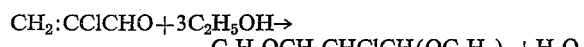

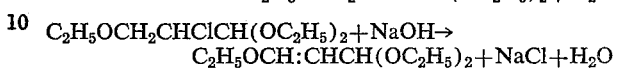

The propene is a compound having great utility in the synthesis of "Sulfadiazine," a sulfur drug. It is also useful as a source material for malonaldehyde, which is formed by hydrolysis in the presence of an acid catalyst.

One of the primary advantages of the method of this invention, in so far as it relates to the preparation of 2-chloroacrolein, is that the dehydrochlorination of 2,3-dichloropropionaldehyde is carried out with considerably greater efficiency than had heretofore been considered possible. It is believed that this greater efficiency is due at least in part to the existence of 2-chloroacrolein as a hemiacetal which does not polymerize as readily as 2-chloroacrolein itself because the double bond is no longer activated by the conjugated carbonyl. The avoidance of polymerization of the 2-chloroacrolein in turn has the advantage of avoiding obstruction of the column and lines of the still with insoluble 2-chloroacrolein polymer, and thereby of avoiding interruptions of the reaction for purposes of cleaning the equipment.

Another important advantage is that the presence of alcohol in the distillate containing 2-chloroacrolein minimizes the powerful lachrymal and vesicatory properties of this product. Perhaps the most important advantage derived from the use of alcohol in the preparation of 2-chloroacrolein is that the alcohol solutions thereof are stable under ordinary conditions of storage and that in this form, the 2-chloroacrolein is readily available as a starting material for the preparation of useful derivatives.

These and other advantages, as well as the utility of the method of this invention, will become further apparent from the following examples included in this description to illustrate the best mode contemplated at present. It is to be understood that the invention is not limited to the specific steps described in the examples.

*Example I.—Preparation of 2-chloroacrolein from acrolein*

A mixture of 560 grams of 95% acrolein, equivalent to 9.5 moles, and 560 grams of carbon tetrachloride was stirred at 0.° C. while chlorine gas was fed to the mixture over a period of 6.4 hours. At the end of this time the yellow color of free chlorine appeared, showing that an excess of chlorine was present. The resulting product was fractionated under reduced pressure. 1030 grams of pure 2,3-dichloropropionaldehyde distilling at 54° C. at a pressure of 20 mm. were isolated and an additional 20 grams was obtained from the mid-fraction. The overall yield of 2,3-dichloropropionaldehyde was 87%.

Portions of the 2,3-dichloropropionaldehyde were admixed with different proportions of ethanol and subjected to dehydrochlorination in a glass distillation column. The column was 1" in diameter, 36" long, packed with glass helices and connected to a 250 cc. "Dowtherm" jacketed, electrically-wound calandria. The column was equipped with a brine-cooled condenser and a take-off was provided at the base of the column so that the overflow from the calandria could be removed continuously. The column was provided with three feed ports, one 12" from the top, one near the base, one at approximately the middle of the column.

In each run sufficient water was placed in the calandria and allowed to reflux in the column. The ethanol solution of 2,3-dichloropropionaldehyde was then fed into the column at the upper feed port and water was fed into one of the two other feed ports. After equilibrium was reached in the column, the distillate was taken off continuously at a head temperature of 78° to 80° C. The excess residual water from the calandria, which contained the hydrochloric acid formed and a small amount of unchanged aldehyde, was discharged through the overflow at the base of the column.

The distillates obtained in each of the runs were ethanolic solutions of 2-chloroacrolein formed in the process and small amounts of dichloropropionaldehyde which distilled unchanged. At the conclusion of each run, the feed was shut off and the head temperature was raised to 98° C. to insure completion of the reaction. The distribution of the aldehyde between the distillate and the residue was obtained by analysis. The conditions and results of these runs are indicated in the table immediately below:

| Mole Ratio of Ethanol to 2,3-Dichloropropionaldehyde in Feed Solution | Volume Ratio of $H_2O$ Feed to Aldehyde Solution Feed | Percent of Total Aldehyde as 2-Chloroacrolein in the Distillate | Percent of Total Aldehyde in the Residue | Percent of Total Aldehyde as 2,3-Dichloropropionaldehyde in the Distillate | Location of Water Feed |
|---|---|---|---|---|---|
| 8/1 | 1/1 | 88.1 | 7.5 | 4.5 | Middle of column. |
| 8/1 | 1/1 | 85.7 | 8.6 | 5.8 | Do. |
| 4/1 | 1/1 | 85.5 | 9.2 | 5.4 | Do. |
| 4/1 | 1/1 | 87.1 | 12.2 | 0.7 | Base of column. |
| 4/1 | 3.5/1 | 90.8 | 5.3 | 3.9 | Do. |
| 6/1 | 1/1 | 93.7 | 5.1 | 1.3 | Middle of column. |
| 6/1 | 1/1 | 93.4 | 4.7 | 1.9 | Base of column. |

*Example II.—Preparation of dilute distilled 2-chloroacrolein in ethanol and reaction thereof to prepare 2-chloro-1,1,3-triethoxypropane*

178 grams of 95% acrolein (3 moles) in 178 grams of benzene were chlorinated at 0° C. until 213 grams of chlorine (3.0 moles) had been added. The chlorination required 30 minutes. The 2,3-dichloropropionaldehyde solution thus obtained was fed dropwise to 3000 cc. of stirred water containing 40 grams of ethanol and hydroquinone inhibiter refluxing on a column fitted with a brine-cooled condenser. 1300 grams of ethanol were added dropwise and simultaneously with the aldehyde solution. A homogenous distillate containing 2-chloroacrolein was taken off continuously at a head temperature of 83°–85° C. The additions were made over a period of 5 hours. Then 40 grams of ethanol were fed while the distillation was continued until the head temperature reached 90° C. Analysis of the distillate (2054 grams) showed that it contained 11.77% 2-chloroacrolein (89.1% yield) and 25.0% water. The distillation was continued at a head temperature of 90° C. while 200 grams more of ethanol were added. This second distillate (353 grams) contained 2.23% 2-chloroacrolein (2.9% yield). Thus the total yield was 92.0% based on acrolein. A total of 1580 grams of ethanol (34.3 moles) were used. The residue (2655 grams) contained 4.08% hydrochloric acid (99% of theory) and 0.123% 2-chloroacrolein (0.04 moles).

A mixture of 2039 grams of the 11.77% 2-chloroacrolein solution (2.65 moles, containing 25.0% water) and 1 cc. of concentrated sulfuric acid (.0375 equivalents) was refluxed on a column fitted with a decanter filled with 168 grams of benzene. After refluxing for 7.5 hours during which period 1048 grams of lower layer were removed from the decanter, 460 grams of ethanol (10 moles) and 100 grams of benzene were added to the kettle and the dehydration process was continued for 8 hours longer. A total of 1409 grams of lower layer of the azeotrope was collected which contained 35.6% water by analysis.

The residue (1230 grams) contained 0.09 equivalents of free acid by analysis. It was distilled under reduced pressure in the presence of 7.4 grams of anhydrous sodium acetate (0.09 equivalents) to neutralize the acid. The principal fraction (379 grams) was 2-chloro-1,1,3-triethoxypropane of at least 95% purity which had these properties: boiling range at 20 mm. absolute—109°–110° C.; specific gravity 20/20°—1.018; refractive index $n_D^{30}$ —1.4245. When the amount of product contained in the mid-cuts was included, the total yield was 413 grams of acetal which corresponded to a yield of 74.1% based on the 2-chloroacrolein charged. Useful by-products contained in the mid-fractions were 2-chloro-3-ethoxypropionaldehyde (8.1% yield) and 2,3-dichloro-1,1-diethoxypropane (6.4% yield).

*Example III.—Reaction of dilute, distilled 2-chloroacrolein with ethanol*

A mixture of 127 grams of distilled 2,3-dichloropropionaldehyde (1 mole), 127 grams of benzene and 276 grams of ethanol (6 moles) was added dropwise to 600 cc. of water refluxing (at atmospheric pressure) through a column fitted with a brine-cooled condenser. After the head temperature had decreased to 89° C. and about 13% of the feed had been added, the distillation was adjusted to a rate such that the head temperature remained at 80°–92° C. while the remainder of the feed was added. The total feed period was 3.6 hours. The distillation was continued for 45 minutes longer until the head temperature reached 99° C. in order to remove all 2-chloroacrolein from the kettle. The distillate (675 grams) was treated with 50 grams of ethanol to make it homogenous. Analysis showed that the resulting solution, which was colorless, contained 0.945 mole of 2-chloroacrolein, or a yield of 94.5%. Analysis of the residue showed that it contained .912 mole of hydrochloric acid, or 91.2% of the theoretical amount.

The distillate was treated with 2 cc. of concentrated hydrochloric acid, 100 grams of benzene and 276 grams of ethanol (6 moles) and refluxed to remove water as the lower layer of the heterogenous azeotrope. A total of 388 grams of lower layer were taken off over a period of 6.5 hours. The residue was fractionated to obtain 2-chloro-1,1,3-triethoxypropane found to have a boiling point, at 20 mm. absolute, of 109° C., a specific gravity at 20/20° of 1.017, and a refractive index $n_D^{30}$ of 1.4250. The yield of this acetal, including the amount in mid-fractions, was 143 grams, which corresponds to an overall yield of 68% based on 2,3-dichloropropionaldehyde. Useful by-products formed were 2,3-dichloro-1,1-diethoxypropane (7% yield) and 2-chloro-3-ethoxypropionaldehyde (13% yield).

Tests showed that dilute 2-chloroacrolein produced in accordance with this process is equivalent to pure distilled 2-chloroacrolein when reacted with ethanol under similar conditions. This was confirmed by refluxing for 14 hours a mixture of 271.45 grams of distilled, pure 2-chloroacrolein (3 moles), 838 grams of ethanol (18 moles), 300 grams of benzene and 1 cc. of concentrated hydrochloric acid. During this time 105 grams of lower layer of the heterogenous azeotrope were collected and the formation of a water layer in the condensate had ceased, indicating the reaction was complete. The residue was distilled to obtain 2-chloro-1,1,3-triethoxypropane (439 grams including amounts contained in mid-fractions) with 69% yield based on 2-chloroacrolein. By-products formed were 2-chloro-3-ethoxypropionaldehyde (18% yield) and 2-chloroacrolein diethyl acetal (13% yield).

*Example IV.—Preparation of 1,1,3-triethoxy-2-propene*

A mixture of 317 grams of 2-chloro-1,1,3-triethoxypropane (1.5 moles), 80 grams of powdered sodium hydroxide (2 moles), 175 grams of ethyl benzene solvent and 22 grams of triethanolamine catalyst (0.15 moles) was stirred and refluxed on a still. Water was removed as the lower layer of the condensate while the oil layer was returned as reflux. The average kettle temperature was 160° C. while the average head temperature was 150° C. for a reaction period of 14 hours. The mixture was then cooled to 30° C. and diluted with 350 cc. of water to dissolve the sodium chloride. The oil layer was separated and distilled under reduced pressure to obtain 158 grams 1,1,3-triethoxy-2-propene having a boiling range, at 20 mm. absolute, of 91°–94° C., a refractive index $n_D^{30}$ of 1.4226, and a specific gravity 20/20° of 0.921. Since an additional 63 grams of this product were in the mid and tail fractions, the total yield was 85% while the efficiency was 95%.

It is to be understood that various modifications of the process described herein will readily occur to those skilled in the art upon reading this description. All such modifications are intended to be included within the scope of the invention as defined in the accompanying claims.

We claim:

1. In a method of preparing 2-chloroacrolein from 2,3-dichloropropionaldehyde which comprises dehydrochlorinating the 2,3-dichloropropionaldehyde with hot water, the improvement which comprises carrying out said dehydrochlorination in the presence of an alcohol selected from the group consisting of primary and secondary monohydric alcohols having not more than ten carbon atoms, the weight of alcohol employed being at least about equal to the weight of 2,3-dichloropropionaldehyde 2. In a method of preparing 2-chloroacrolein from 2,3-dichloropropionaldehyde which comprises dehydrochlorinating the 2,3-dichloropropionaldehyde with hot water under a reflux column and condensing 2-chloroacrolein from the vapors obtained thereby, the improvement which comprises introducing the 2,3-dichloropropionaldehyde slowly into the reflux column and carrying out the dehydrochlorination thereof in the presence of ethanol in an amount at least about equal to the weight of 2,3-dichloropropionaldehyde.

3. In a method of preparing 2-chloroacrolein from 2,3-dichloropropionaldehyde which comprises dehydrochlorinating the 2,3-dichloropropionaldehyde with hot water under a reflux column and condensing 2-chloroacrolein from the vapors obtained thereby, the improvement which comprises introducing the 2,3-dichloropropionaldehyde slowly into the reflux column and carrying out the dehydrochlorination thereof in the presence of an alcohol selected from the group consisting of primary and secondary monohydric alcohols having not more than ten carbon atoms, the weight of alcohol employed being at least about equal to the weight of 2,3-dichloropropionaldehyde.

4. In a method of preparing 2-chloroacrolein from 2,3-dichloropropionaldehyde which comprises dehydrochlorinating the 2,3-dichloropropionaldehyde with hot water under a reflux column and condensing 2-chloroacrolein from the vapors obtained thereby, the improvement which comprises introducing an ethanol solution of the 2,3-dichloropropionaldehyde into the reflux column at a rate about equal to the rate of dehydrochlorination, the molar proportion of ethanol to 2,3-dichloropropionaldehyde being within the range of about 2:1 to 15:1.

5. In a method of preparing 2-chloroacrolein from 2,3-dichloropropionaldehyde which comprises dehydrochlorinating the 2,3-dichloropropionaldehyde with hot water under a reflux column and condensing 2-chloroacrolein from the vapors obtained thereby, the improvement which comprises separately and simultaneously introducing ethanol and the 2,3-dichloropropionaldehyde into the reflux column, the rate of introduction of 2,3-dichloropropionaldehyde being about equal to the rate of dehydrochlorination and the molar ratio of ethanol to 2,3-dichloropropionaldehyde ranging upwards from 4:1.

6. A method of preparing 2-chloroacrolein which comprises dehydrochlorinating 2,3-dichloropropionaldehyde with hot water in the presence of an alcohol selected from the group consisting of primary and secondary monohydric alcohols having not more than ten carbon atoms, the weight of alcohol employed being at least about equal to the weight of 2,3-dichloropropionaldehyde.

7. A method of preparing 2-chloroacrolein which comprises dehydrochlorinating 2,3-dichloropropionaldehyde with hot water in the presence of ethanol in an amount at least about equal to the weight of 2,3-dichloropropionaldehyde.

8. In a method of preparing 2-chloro-1,1,3-triethoxypropane which comprises chlorinating acrolein to form 2,3-dichloropropionaldehyde, dehydrochlorinating the dichloropropionaldehyde with hot water to form a distillate containing 2-chloroacrolein and water, dehydrating said distillate, and refluxing said 2-chloroacrolein in the dehydrated distillate with ethanol to form 2-chloro-1,1,3-triethoxypropane, the improvement which comprises dehydrochlorinating the dichloropropionaldehyde in the presence of an alcohol selected from the group consisting of primary and secondary monohydric alcohols having not more than ten carbon atoms, the weight of alcohol employed being at least about equal to the weight of 2,3-dichloropropionaldehyde.

9. The method defined in claim 8 wherein the alcohol is ethanol.

10. In a method of preparing 1,1,3-triethoxy-2-propene which comprises chlorinating acrolein to form 2,3-dichloropropionaldehyde, dehydrochlorinating the dichloropropionaldehyde with hot water to form a distillate containing 2-chloroacrolein and water, dehydrating said distillate, refluxing the 2-chloroacrolein in the dehydrated distillate with ethanol to form 2-chloro-1,1,3-triethoxypropane, and reacting said triethoxypropane with an alkali metal hydroxide in the presence of a catalyst at an elevated temperature to form 1,1,3-triethoxy-2-propene, the improvement which comprises dehydrochlorinating the dichloropropionaldehyde in the presence of an alcohol selected from the group consisting of primary and secondary monohydric alcohols having not more than ten carbon atoms, the weight of alcohol employed being at least about equal to the weight of 2,3-dichloropropionaldehyde.

11. The method defined in claim 10 wherein the alcohol in the dehydrochlorination step is ethanol.

References Cited in the file of this patent

FOREIGN PATENTS

| | | |
|---|---|---|
| 554,570 | Great Britain | July 9, 1943 |
| 478,139 | Canada | Oct. 30, 1951 |
| 896,193 | Germany | Nov. 9, 1953 |

OTHER REFERENCES

Blatt: "Org. Syn.," vol. II, pg. 17 (1943).
Hall et al.: J. Chem. Soc., 1954, pgs. 3389, 3390.